United States Patent [19]

Grüning

[11] Patent Number: 4,895,917

[45] Date of Patent: Jan. 23, 1990

[54] ORGANOPOLYSILOXANES WITH BUNTE SALT GROUPS

[75] Inventor: Burghard Grüning, Essen, Fed. Rep. of Germany

[73] Assignee: Th. Goldschmidt AG, Essen, Fed. Rep. of Germany

[21] Appl. No.: 251,185

[22] Filed: Sep. 29, 1988

[30] Foreign Application Priority Data

Oct. 16, 1987 [DE] Fed. Rep. of Germany ....... 3735086

[51] Int. Cl.$^4$ ............................................. C08G 77/00
[52] U.S. Cl. ........................................ 528/10; 528/12; 528/25; 528/33; 525/474; 556/428; 428/389; 428/391; 427/387
[58] Field of Search ....................... 528/10, 25, 12, 33; 525/474; 556/428

[56] References Cited

U.S. PATENT DOCUMENTS 4,537,595 8/1985 Grüning et al. ................... 427/412

FOREIGN PATENT DOCUMENTS 3323881 6/1985 Fed. Rep. of Germany .

Primary Examiner—Melvyn I. Marquis
Attorney, Agent, or Firm—Toren, McGeady & Associates

[57] ABSTRACT

Organopolysiloxanes with Bunte salt groups linked over carbon atoms are disclosed, as well as methods for the synthesis of these compounds by the reaction of organopolysiloxanes having epoxy groups with, in relation to the epoxy groups, equimolar amounts of $Me_2S_2O_3$, in which Me is an alkali metal or an optionally substituted ammonium group. The compounds may be used for the permanent finishing of fibers or fiber products or for the treatment of hair.

8 Claims, No Drawings

ORGANOPOLYSILOXANES WITH BUNTE SALT GROUPS

FIELD OF INVENTION

The invention generally relates to organopolysiloxanes with Bunte salt groups linked over carbon atoms and is particularly directed to novel such organopolysiloxanes, which additionally contain oxyalkylene groups, especially polyoxyalkylene groups, and to a method for preparing the novel organopolysiloxanes.

Considered from another aspect, the invention is concerned with novel organopolysiloxanes suitable for finishing fibers and fiber products and for treating hair.

BACKGROUND INFORMATION AND PRIOR ART

Organopolysiloxanes with Bunte salt groups linked over carbon atoms have previously been disclosed.

Such organopolysiloxanes are thus taught in German Pat. No. 3,323,881. These organopolysiloxanes with Bunte salt groups correspond to the general formula

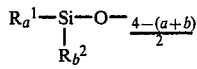

wherein
$R^1$ is methyl, with the proviso that up to 10% of the $R^1$ groups may be alkyl with up to 18 carbon atoms, vinyl, phenyl or hydroxyl groups or hydrogen,
$R^2$ is

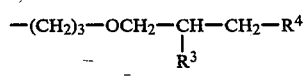

or

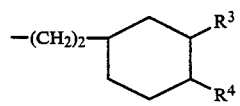

wherein one of the $R^3$ or $R^4$ groups is a hydroxy group, while the other is $-S_2O_3Me$ (Me=alkali metal or an ammonium group which may be optionally substituted), with the proviso that, in up to 50% of the $R^2$ groups, $R^3$ and $R^4$ may be hydroxyl or, together, the oxygen moiety of an oxiran ring,
a has any value from 1 to 2.33 and
b has any value from 0.02 to 1.

Bunte salts are hydrolyzed by aqueous acids with formation of thiols. In alkaline medium, the materials formed include the corresponding disulfides. The reactivity is utilized, for example, to fix dyes with Bunte salt groups to textile material.

The functional groups of the fibers, such as the OH groups of cellulose, the amino and thiol groups of wool or the acid amide groups of synthetic polyamides, react in this dye-fixing reaction as neucleophilic agents. After pretreatment of cellulose with sodium sulfide solution or in the treatment of wool, a polycondensation reaction takes place on the substrate with formation of disulfide bridges. A corresponding dyeing with Bunte salt dyes is therefore waterproof.

The organopolysiloxanes with Bunte salt groups described in the German Pat. No. 3,323,881 are suitable for the surface treatment of inorganic and organic materials. They have been shown to be particularly suitable for the treatment of textile materials, especially wool. It is a particular advantage of these compounds that, when applied on textile surfaces, they are cross linked already at room temperature by the addition of sodium sulfide with the formation of a film, resulting in a permanent finish of the textile material. Fibers and yarns and woven, knitted, nonwoven or other materials can be treated in this manner.

These compounds are particularly suitable for shrink-proofing wool. For this purpose, the compounds are applied on the fibers in the form of a solution or dispersion in water or water/alcohol mixtures in amounts of 0.1 to 5%. The finishes obtained are resistant to organic solvents, such as those used, for example, in dry cleaning.

In contrast to conventional methods for finishing wool, especially for finishing woolen slubbing, the oxidative pretreatment of the fibers can be omitted in this method. This represents distinct progress, since the fibers can be damaged significantly by treatment with chlorine or peroxides.

Aside from the treatment of textiles, the known Bunte salt groups containing siloxanes, can furthermore be used very advantageously for providing other solid materials, such as paper or slag wool with a hydrophobic finish. In these applications also, the important special feature of the siloxanes containing Bunte salt groups lies therein that they can be caused to cross link already at room temperature by the addition of sulfides.

The Bunte salt groups containing siloxanes, described in the German Pat. No. 3,323,881, dissolve in water, provided they contain a sufficiently large proportion of Bunte salt groups. There is a relationship between the number of silicon atoms in the polysiloxane and the number of Bunte salt groups required for solubilization. As the molecular weight of the organopolysiloxane increases, an increasing number of Bunte salt groups is required for water solubility. However, application disadvantages, which arise out of the increase in the cross linking density of the polymer cross linked on the substrate, stand in the way of increasing the number of Bunte salt groups. A highly cross linked polymer can produce an undersirably hard handle in finished fabrics. The increase in the cross linking density leads to an increase in the shrinkage of the polymer that is formed. As a result, the coating of inorganic or organic materials can become uneven or incomplete.

Due to the reaction of the Bunte salt groups, the hydrophilic portion of the organopolysiloxanes is lost during the cross linking reaction and the finish necessarily develops water-repellent properties on the substrate, which are frequently undesirable.

OBJECTS OF THE INVENTION

It is therefore an object of the present invention to provide novel organopolysiloxanes containing Bunte salt groups, which do not have the aforementioned disadvantages. More particularly, it is desirable to provide organopolysiloxane Bunte salts, in which the hydrophilic and hydrophobic behavior is matched to the intended application and which provide the materials so finished with a balanced measure of hydrophilicity.

Another object of the invention is to provide a simple method for the preparation of novel Bunte salt groups comprising organopoysiloxanes which have the above properties.

It is also an object of the invention to provide novel Bunte salt groups comprising polysiloxanes which are suitable for finishing fibers and fiber products and for the treatment of hair.

Generally, it is an object of the invention to improve on the art of organopolysiloxanes comprising Bunte salt groups and the methods for their preparation.

SUMMARY OF THE INVENTION

The desired behavior, or coordination with respect to the hydrophilicity and the hydrophobicity, is exhibited by novel organopolysiloxanes of the general formula

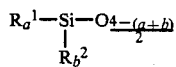   I wherein
$R^1$ is methyl, with the proviso that up to 10% of $R^1$ may be phenyl,
$R^2$ represents $R^3$

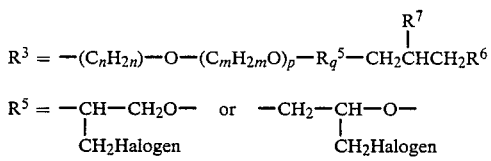

$$R^5 = -CH-CH_2O- \text{ or } -CH_2-CH-O-$$
$$\quad\quad\quad |\qquad\qquad\qquad\qquad\quad |$$
$$\quad\quad CH_2Halogen \qquad\quad\; CH_2Halogen$$

One of the two groups $R^6$, $R^7 = -OH$, while the other is $-S_2O_3Me$
Me=alkali metal or an, optionally substituted, ammonium group
n=3 to 6,
m=2 to 3,
p=0 to 100,
q=0 to 5, and/or

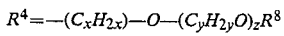

$R^8$=hydrogen, alkyl or acyl with 1 or 4 carbon atoms
x=3 to 6,
y=2 to 3,
z=1 to 100,
with the proviso that, in the average molecule, at least one $R^2$ group has the meaning of the $R^3$ group and, when p=0 in $R^3$, at least one $R^4$ group is present,
a=1 to 2.33
b=0.02 to 1 and
$2 \leq a+b \leq 3$.

Of particular importance in this formula is the definition of $R^2$. This $R^2$ group can represent two different groups namely $R^3$ or $R^4$.

Preferred are organopolysiloxanes, in which $R^2$ has the meaning of $R^3$.

Within $R^3$, $C_nH_{2n}$ represents an alkylene group, which has 3 to 6 carbon atoms. This alkylene group may be linear or branched. The alkylene group preferably is $-(CH_2)_3-$. $R^3$ is thus linked over carbon to the silicon atom. $C_nH_{2n}O$ is an oxyalkylene group. Subscript m may assume a numerical value of 2 or 3, depending on whether this groups represents an oxyethylene or an oxypropylene group. However, since Formula I is a general, average formula and oxyethylene units as well as oxypropylene units may be present side by side in the average molecule, the value of the subscript m may numerically also assume a fractional value between 2 and 3. The number of oxyalkylene units is represented by the subscript p. In the average molecule, subscript p has a value of 0 to 100. It should be noted in this connection that, aside from the $R^3$ groups, $R^4$ groups must be present as well when p=0 in the average molecule. $R^5$ is formed by

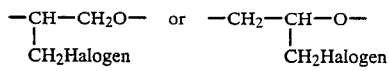

Halogen indicates halogen groups, preferably chlorine. The number of $R^5$ groups is represented by the subscript q, which may have a value from 0 to 5. The $R^5$ groups are formed as a result of the manufacturing conditions and contribute little, if at all, to the properties of the inventive organopolysiloxanes.

One of the two $R^6$ and $R^7$ groups represents a Bunte salt group, $-S_2O_3Me$, in which Me is an alkali metal, preferably sodium, or an, optionally substituted, ammonium group. Examples of substituted ammonium groups are the tetrabutylammonium, tetramethylammonium or didecyldimethylammonium group. The other $R^6$ or $R^7$ group is a hydroxyl group.

$R^2$ may optionally also be the $R^4$ group. In this connection, it should be noted that the presence of at least one $R^3$ group is obligatory. The simultaneous presence of the $R^4$ group is obligatory only if subscript p=0 in the $R^3$ group.

Within the $R^4$ group, $C_xH_{2x}$ corresponds to the $C_nH_{2n}$ group of $R^3$. However, the two groups need not be identical. Similarly, the $(C_yH_{2y}O)_z$ group of $R^4$ corresponds to the $(C_mH_{2m}O)_p$ group of $R^3$. Once again, these two groups do not have to be identical. $R^8$ is hydrogen or alkyl or acyl with 1 to 4 carbon atoms. The methyl group is preferred as alkyl and the acetyl group as acyl.

The required coordination between the hydrophilic and the hydrophobic behavior can be brought about in two different ways. For example, it is possible to increase the hydrophilicity of these inventive organopolysiloxanes in accordance with the state of the art by the number of Bunte salt groups (corresponding to the number of $R^3$ groups) present in the average molecule. However, when the products are cross linked on a substrate, this hydrophilizing action is canceled by the reaction of the Bunte salt groups. The hydrophilicity of the invention organopolysiloxanes may, however, be additionally influenced by the nature and number of oxyalkylene groups, the hydrophilicity increasing as the oxyethylene content increases. This hydrophilization of the organopolysiloxane is also retained after the reaction of the Bunte salt groups on the substrate. The hydrophilicity may additionally be affected and selectively influenced by the ratio of oxyethylene to oxypropylene groups. It becomes understandable from this observation that, when p=0 in $R^3$, one or several $R^4$ groups must be present in order to ensure the required hydrophilicity.

Examples of organopolysiloxanes, modified pursuant to the invention, are reproduced by the following formulas. Those skilled in the art will understand that these formulas are average, idealized formulas. It is in the nature of organosilicon chemistry that such organopolysiloxanes are always present in the form of mixtures, for example, of siloxane blocks of different length.

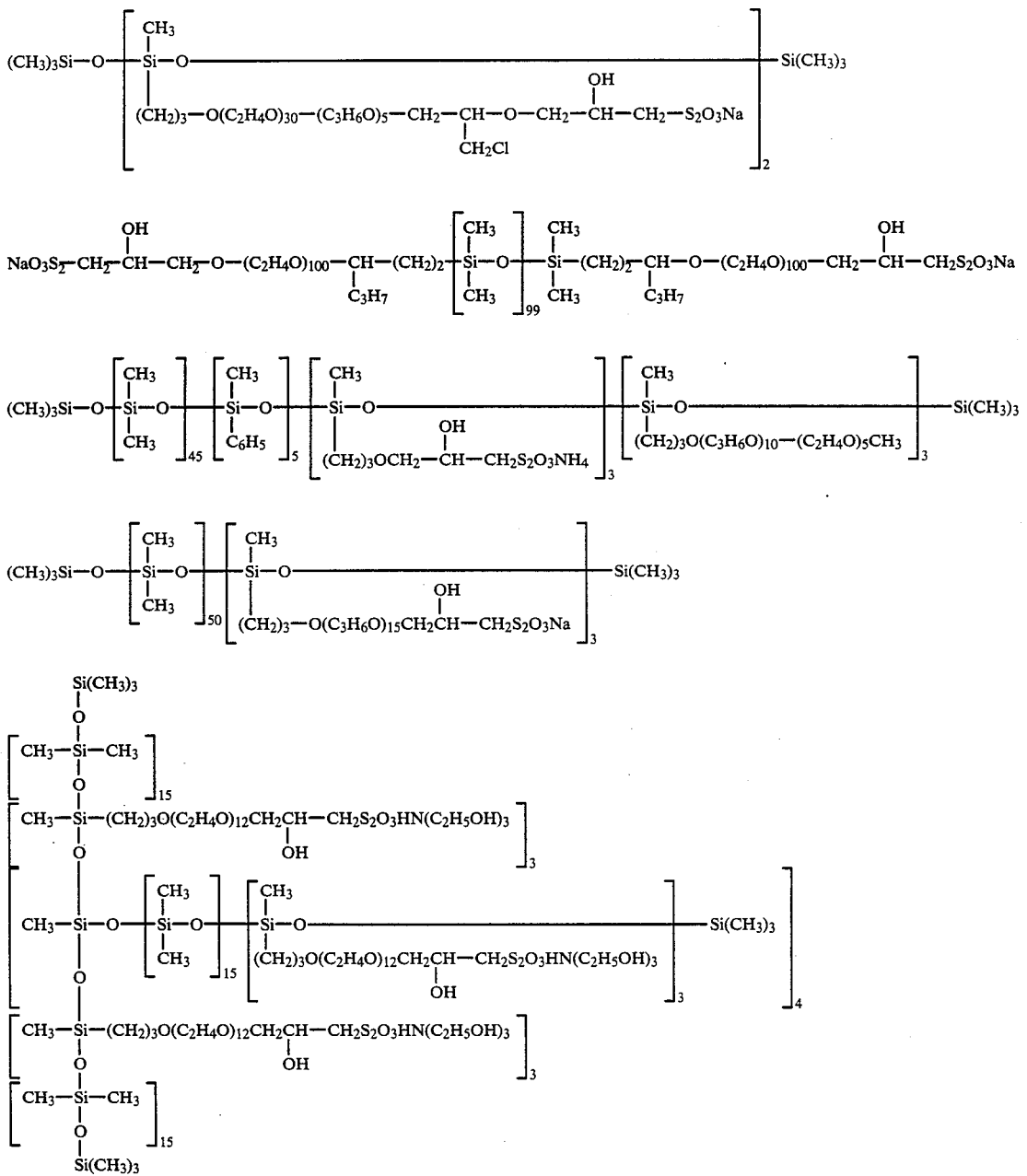

In accordance with a further aspect of the invention, the novel organopolysiloxanes with oxyalkylene Bunte salt groups are advantageously synthesized by reacting organopolysiloxanes, comprising epoxide groups and represented by the following general formula

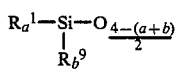     II wherein
$R^1$, a and b are defined as above and
$R^9$ is the $R^{10}$ group

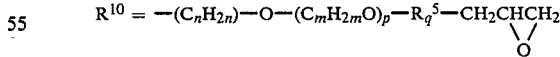

$R^5$, n, m, p, q are as defined above, or the $R^4$ group, $R^4$ being as defined above, with the proviso that, in the average molecule, at least one $R^9$ group represents the $R^{10}$ group and at least one $R^4$ group is present when p=0 in $R^{10}$, with, in respect to the epoxide groups, equimolar amounts of $Me_2S_2O_3$ in an aqueous medium, to which polar organic solvents are optionally added, at temperatures up to 100° C., acids being added during the reaction in such amounts, that the pH is maintained between 5 and 9.

As polar organic solvents, preferably lower aliphatic alcohols, such as ethanol or isopropanol, are used. Preferably 0.5 to 5 parts by volume of organic solvent are used per part by volume of water.

The reaction proceeds at room temperature or moderately elevated temperatures, the reaction rate decreasing with increasing molecular weight and increasing hydrophobicity of the organopolysiloxane. The reaction is therefore carried out, if necessary, at temperatures up to 100° C.

It is essential that a pH of 5 to 9 is maintained during the reaction. This is advantageously accomplished by the addition of an acid, especially by the addition of dilute hydrochloric acid or acetic acid. Compounds, which split off acid, or suitable ion exchangers charged with acidic groups may also be used.

It is accomplished in this manner that the reaction of the thiosulfate with the epoxide groups of the polysiloxane proceeds to completion. It is not permissible initially to add the acid, required to neutralize the base that is released, since in such event the Bunte salt formed would be decomposed by the acidic medium. Rather, it is important that the necessary pH range of 5 to 9 be maintained during the reaction. This requires the controlled and constant addition of acid.

The inventive compounds, synthesized according to the aforementioned method, are liquid, pasty or solid substances, depending on the molecular weight, the degree of branching and the structure of the polyoxyalkylene chains and the content of Bunte salt groups.

In the inventive method, the possibility cannot be excluded that a small proportion of epoxide groups remains in the product during the ring-opening reaction with thiosulfate. However, these groups do not interfere with the subsequent application of the products for the intended purposes.

Those skilled in the art are familiar with the preparation of the starting products. The starting compounds can be synthesized, for example, by the addition reaction of allyl polyoxyalkylene glyticyl ether to hydrogenpolysiloxane.

The invention finally is directed to the use of the compounds obtained for permanently finishing fibers and fiber products. Pursuant to the invention, the compounds may furthermore be used for the treatment of animal and human hairs. In the treatment of fibers or fiber products, such as textile, a wash-fast, that is, permanent finish is obtained, which withstands soiling to a particularly high degree and gives the substrate a pleasant, soft handle. Due to the increased hydrophilicity of the finish, especially the comfort of wearing the finished textiles is improved.

The inventive compounds may be applied in the form of an aqueous preparation, preferably an aqueous solution, in amounts of 0.1 to 5% on the fibers or the fiber product, where they can be cross linked already at room temperature with film formation by the addition of suitable agents forming or containing SiH groups, such as sodium sulfide, thioglycolic acid or cysteine.

For the treatment of animal or human hair, dilute aqueous or dilute aqueous/alcoholic solutions are applied on the hair. The combability, the smoothness and the natural gloss of the hair are improved by the treatment. A certain degree of permanence can be imparted to this effect by cross linking the compounds partially or completely. More particularly, heavily damaged hair, such as hair subjected to intensive bleaching with preparations containing hydrogen peroxide, can be significantly improved in this manner with respect to smoothness, combability and gloss.

In the treatment of wool, especially knitted wool products, the shrinkage and felting of the wool is reduced. It is of particular importance that a permanent anchoring on the wool is achieved by the cross linking, so that the treated wool products can be washed in aqueous washing liquors or dry cleaned in organic solvents, repeatedly without removal of the finish.

The synthesis and use of the inventive compounds is described in greater detail in the following examples, it being understood that these examples are given by way of illustration and not by way of limitation.

Examples 1 to 8 are directed to the inventive synthesis of silicone polyether Bunte salts.

EXAMPLE 1

$Na_2S_2O_3.5H_2O$ (87.5 g, 0.353 moles), 900 mL water and 500 g of the epoxy-functional silicone polyether copolymer of average formula

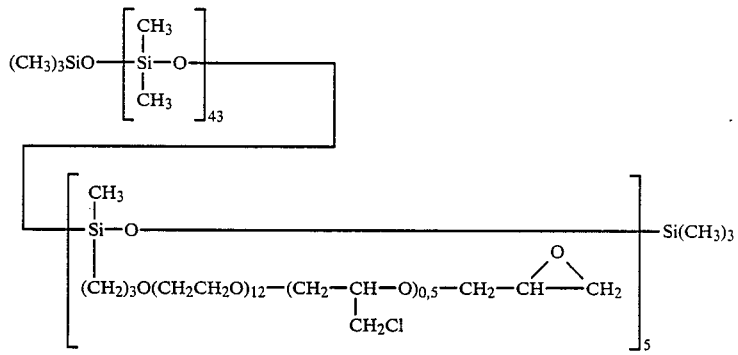

are mixed at room temperature. The pH is monitored. The reaction mixture is heated to 50° C. The start of the reaction is indicated by an increase in the pH. The pH is maintained between 8 and 9 by the continuous addition of acetic acid. After about 2 hours, the temperature is increased to 80° C. After a further 2 hours, the reaction is completed. The end of the reaction is indicated by the fact that the pH no longer changes. Finally, the pH is adjusted to a value of 7 with acetic acid. In all, 21.5 g of acetic acid are added dropwise. The solution of the silicone polyether Bunte salt formed contains about 38% solids. The product can be used in this form for different applications. It is not necessary to isolate the active ingredient.

EXAMPLE 2

Na$_2$S$_2$O$_3$·5H$_2$O (70.5 g, 0.284 moles), 190 mL water, 435 mL isopropanol and 500 g of the epoxy-functional silicone polyether copolymer of average formula

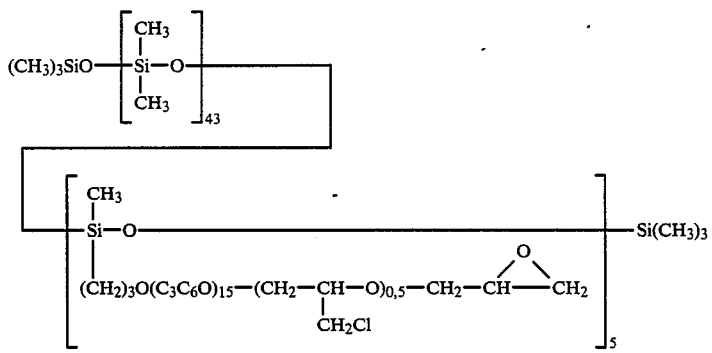

are mixed at room temperature. The reaction mixture is heated to 80° C. The pH is maintained between 8 and 9 by the continuous addition of acetic acid. The reaction is finished when the pH no longer changes. This is the case after about 7 hours. Subsequently, the pH is adjusted to about 7 with acetic acid. In all, 17 g of acetic acid are added dropwise. The resulting solution of the silicone polyether Bunte salt formed contains about 50% solids. The product can be used in this form for various applications.

EXAMPLE 3

Na$_2$S$_2$O$_3$·5H$_2$O (78.8 g, 0.318 moles), 155 mL water and 430 mL isopropanol and 500 g of the epoxy-functional silicone polyether copolymer of average formula

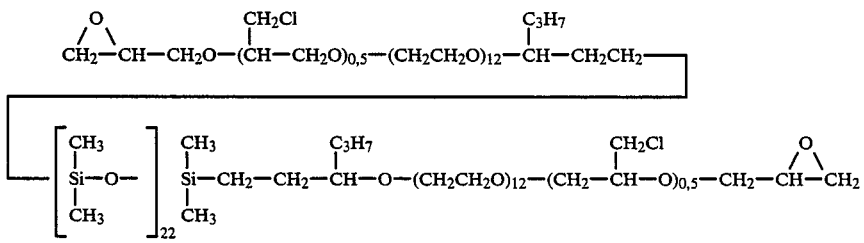

are mixed at room temperature and reacted as described in Example 2. A total of 19.1 g of acetic acid is required for the neutralization. The solution of the silicone polyether Bunte salt formed contains about 50% solids.

EXAMPLE 4

Na$_2$S$_2$O$_3$·5H$_2$O (23.3 g, 94 moles), 165 mL water, 400 mL isopropanol and 500 g of the epoxy-functional silicone polyether copolymer of average formula

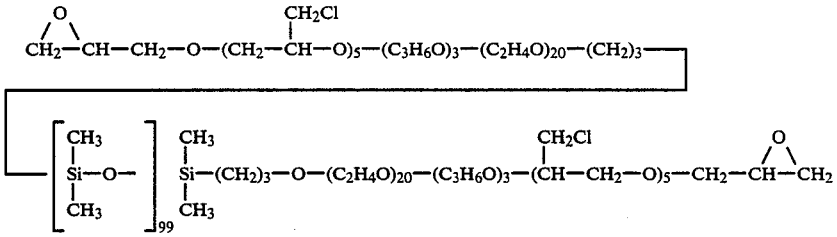

are mixed at room temperature and reacted by the procedure given in Example 2. For the neutralization, a total of 5.6 g of acetic acid is required. The solution of the silicone polyether Bunte salt contains about 50% solids.

EXAMPLE 5

Na$_2$S$_2$O$_3$·5H$_2$O (76.9 g, 0.31 moles), 160 mL water, 440 mL isopropanol and 500 g of the epoxy-functional silicone polyether copolymer of average formula

EXAMPLE 7

Na$_2$S$_2$O$_3$.5H$_2$O (157.7 g, 0.636 moles), 155 mL water, 495 mL isopropanol and 500 g of the epoxy-functional silicone polyether copolymer of average formula

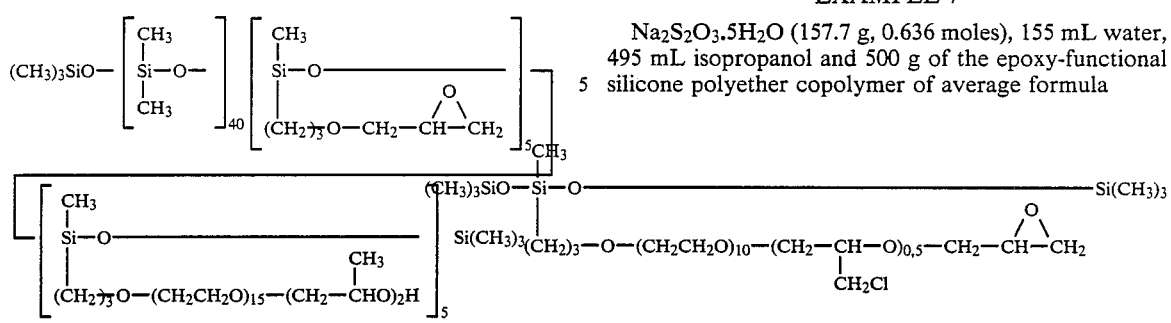

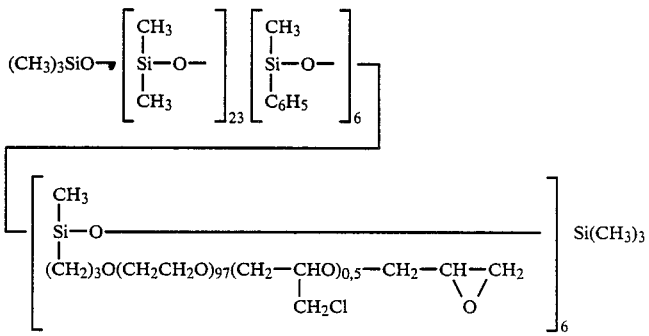

are mixed at room temperature and reacted by the procedure given in Example 2. However, the temperature is raised only slowly to 50° C. For the neutralization, a total of 38 g of acetic acid is required. The solution of the silicone polyether Bunte salt formed contains about 50% solids.

EXAMPLE 8

Na$_2$S$_2$O$_3$.5H$_2$O (25.3 g, 0.102 moles), 165 mL water, 405 mL isopropanol and 500 g of the epoxy-functional silicone polyether copolymer of average formula are mixed at room temperature and reacted by the procedure given in Example 2. For the neutralization, a total of 18.5 g of acetic acid is required. The solution of the silicone polyether Bunte salt formed contains about 50% solids.

EXAMPLE 6

Na$_2$S$_2$O$_3$.5H$_2$O (70.2 g, 0.283 moles), 162 mL water, 435 mL isopropanol and 500 g of the epoxy-functional silicone polyether copolymer of average formula

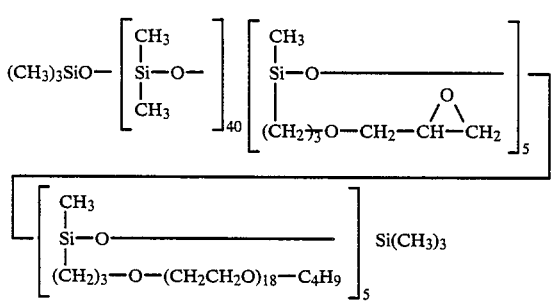

are mixed at room temperature and reacted by the procedure given in Example 2. For the neutralization, a total of 17 g of acetic acid is required. The solution of the silicone polyether Bunte salt formed contains about 50% solids.

are mixed at room temperature and reacted by the procedure given in Example 2. For the neutralization, a total of 6 g of acetic acid is required. The solution of the silicone polyether Bunte salt formed contains about 50% solids.

EXAMPLE 9

Use of the Inventive Compounds for the Treatment of Hair

Natural, Chinese, cut hair is tied together into bundles of about 1 g each. The hair is washed with water and dried. Subsequently, it is immersed for 1 hour at room temperature in solutions of the following composition:

(A) 10% (active ingredient) silicone polyether Bunte salt, the synthesis of which is described in Example 1, in water (B) 10% (active ingredient) silicone polyether Bunte salt from Example 1, 8% thioglycolic acid in water (C) 10% (active ingredient) silicone polyether Bunte salt from Example 3 in water (D) 10% (active ingredient) silicone polyether Bunte salt from Example 3, 8% thioglycolic acid in water (E) 8% thioglycolic acid in water Subsequently, the hair is washed and dried with a hair blower. The increase in the weight of the hair is determined. The hair is evaluated with respect to its feel in the dry state. The results are summarized in Table 1.

TABLE 1

| Treatment | Weight Difference | Feel |
|---|---|---|
| A | +0.1% | smooth (somewhat inferior to C) |
| B | +0.2% | smooth and soft |
| C | <0.1% | smooth |
| D | +0.1% | smooth and soft |
| E | <0.1% | slightly dull |
| untreated | — | dull |

EXAMPLE 10

Hydrophilic Finish for Polyester Fabric

A 100% polyester fabric (58.3 g/m$^2$) is padded with freshly prepared liquor of the following composition:

(A) 20 g/L, based on the active ingredient, of silicone polyether Bunte salt from Example 1

(B) 20 g/L, based on the active ingredient, of silicone polyether Bunte salt from Example 2

(C) 20 g/L, based on the active ingredient, of silicone polyether Bunte salt from Example 1 and 16 g/L thioglycolic acid (D) 20 g/L, based on the active ingredient, of silicone polyether Bunte salt from Example 2 and 16 g/L thioglycolic acid (E) 20 g/L of a silicone Bunte Salt corresponding to the German Pat. No. 3,323,881 of the following average composition and 16/g/L of thioglycolic acid

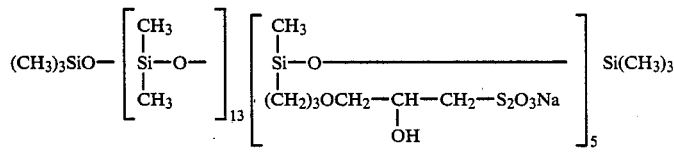

(F) 16 g/L thioglycolic acid (G) 20 g/L of a silicone polyether of the following average formula

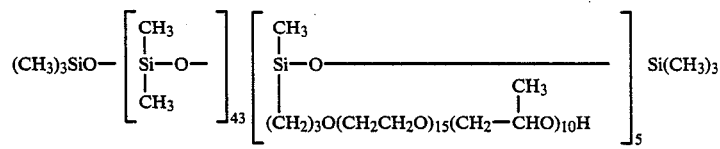

After it is squeezed, the wet take-up of the fabric is 98%, so that finally 2% of active ingredient remain on the fabric. After being padded the fabric is dried within 5 minutes at 70° C. in a forced-air oven. The hydrophilicity of the fabric is determined by placing a water droplet upon it. The time required by the droplet to penetrate the fabric completely is ascertained. Before the measurement, the fabric is stored in each case for 1 day at 20° C. and a relative humidity of 55%. To test the water resistance of the finish, the fabric is washed repeatedly with water and dried in a tumble dryer. The determination of the hydrophilicity is repeated after one, two, five and ten launderings. The results are summarized in Table II.

TABLE II

| | Droplet Penetration Time [sec] Number of Launderings | | | | |
|---|---|---|---|---|---|
| Finish | 0 | 1 | 2 | 5 | 10 |
| not finished | >1800 | >1800 | >1800 | >1800 | >1800 |
| A | 14 | 31 | 40 | 300 | >1800 |
| B | 16 | 35 | 45 | 540 | >1800 |
| C | 30 | 35 | 40 | 120 | 300 |
| D | 30 | 37 | 46 | 300 | 780 |
| E | >1800 | >1800 | >1800 | >1800 | >1800 |
| F | 570 | >1800 | >1800 | >1800 | >1800 |
| G | 900 | 1200 | 1920 | >1800 | >1800 |

EXAMPLE 11

Finishing Wool

Finely knitted material of pure, shorn wool is impregnated with a liquor (A), namely 2% of a silicone Bunte salt (according to German Pat. No. 3,323,881) of average formula $$(CH_3)_3SiO\left[\begin{array}{c}CH_3\\|\\Si-O-\\|\\CH_3\end{array}\right]_{13}\left[\begin{array}{c}CH_3\\|\\Si-O\\|\\(CH_2)_3OCH_2-CH-CH_2-S_2O_3Na\\|\\OH\end{array}\right]_5 Si(CH_3)_3$$

and (B), namely 2% (based on the active ingredient) of a silicone polyether Bunte salt, the synthesis of which is described in Example 1. For the purpose of curing, the pieces subsequently are treated with a 0.8% solution of thioglycolic acid and dried in a tumble dryer at 45° C. The materials have a pleasant, soft handle. In the cubex test (as specified by the IWS), the tendency to shrink of the finished pieces was distinctly less than that of an untreated sample. The sample, finished pursuant to the invention, shows the best results and is, moreover, distinctly more hydrophilic.

The following results are obtained (Table III):

TABLE III

| | Area Felting Shrinkage |
|---|---|
| Untreated material | 56% |
| Material treated according to A | 13% |

TABLE III-continued

| | Area Felting Shrinkage |
|---|---|
| Material treated according to B | 11% |

I claim:

1. An organopolysiloxane with Bunte salt groups linked over carbon atoms of the general formula $$R^1_a\text{—Si—}O_{\frac{4-(a+b)}{2}} \quad \text{I}$$
$$\quad\quad |$$
$$\quad R^2_b$$

wherein $R^1$ is methyl or phenyl, with the proviso that at least 90% of $R^1$ is methyl;

$R^2$ is selected from the group consisting of (i) $R^3$ and (ii) $R^4$, in which $R^3$ is $$-(C_nH_{2n})-O-(C_mH_{2m}O)_p-R^5_q-CH_2\overset{\overset{R^7}{|}}{C}HCH_2R^6 \quad \text{with}$$

$$R^5 = -\underset{\underset{CH_2\text{Halogen}}{|}}{CH}-CH_2O- \quad \text{or} \quad -CH_2-\underset{\underset{CH_2\text{Halogen}}{|}}{CH}-O-$$

one of the two groups $R^6$, $R^7$ being —OH, while the other is —$S_2O_3$Me, in which Me is alkali metal, ammonium or substituted ammonium, $n=3$ to 6, $m=2$ to 3, $p=0$ to 100, $q=0$ to 5, and (ii) $R^4$ is —$(C_xH_{2x})$—O—$(C_yH_{2y}O)_zR^8$, in which $R^8$ is alkyl or acyl with 1 to 4 carbon atoms or hydrogen, $x=3$ to 6, $y=2$ to 3, and $z=1$ to 100, with the proviso that, in the average molecule, at least one $R^2$ group has the meaning of $R^3$ and, when $p=0$ in $R^3$, at least one $R^4$ group is present, $a=1$ to 2.33

$b=0.02$ to 1 and $2 \leq a+b \leq 3$.

2. An organopolysiloxane as claimed in claim 1, wherein p is at least one and all the $R^2$ groups are $R^3$.

3. An organopolysiloxane as claimed in claim 1, wherein the $C_nH_{2n}$ moiety of $R^3$ is a linear or branched alkylene of 3–6 carbon atoms.

4. An organopolysiloxane as claimed in claim 1, wherein $R^3$ comprises oxyethylene and oxypropylene units.

5. An organopolysiloxane as claimed in claim 1, wherein the halogen of $R^5$ is chlorine.

6. An organopolysiloxane as claimed in claim 1, wherein the alkali metal of Me is sodium.

7. An organopolysiloxane as claimed in claim 1, wherein the substituted ammonium of Me is tetrabutylammonium, tetramethylammonium or didecyldimethylammonium.

8. An organopolysiloxane as claimed in claim 1, wherein the alkyl of $R^8$ is methyl while the acyl of $R^8$ is acetyl.

* * * * *